Patented Mar. 25, 1952

2,590,126

UNITED STATES PATENT OFFICE 2,590,126

QUATERNARY AMMONIUM SALTS OF 2,6-LUPETIDINE

Richard A. Robinson, Morton Grove, Ill., assignor to G. D. Searle & Co., Skokie, Ill., a corporation of Illinois No Drawing. Application March 10, 1948, Serial No. 14,164

4 Claims. (Cl. 260—293)

This invention relates to quaternary ammonium salts derived from 2,6-lupetidine, and to the preparation thereof. More particularly, it relates to substances having the general structural formula

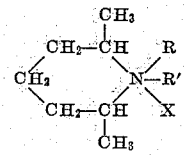

wherein R and R' are alkyl, alkenyl, aralkyl, or hydroxyalkyl radicals having a total number of carbon atoms of 3 to 10, and X represents a monovalent anion, preferably a halide ion.

The compounds which comprise this invention are useful surface-active substances. They are also in general antiseptics and germicides. The compounds are of value as antispasmodic and antihistaminic agents and as autonomic ganglionic blocking agents. It is the object of this invention to provide new compositions of matter which are of value for the foregoing uses. It is a further object of this invention to provide effective methods for producing such substances.

In the compounds of the foregoing general structural formula, R and R' can represent alkyl radicals such as methyl, ethyl, propyl, isopropyl, butyl, isobutyl amyl, hexyl, heptyl, octyl, nonyl, and the like, wherein the alkyl radical may have a straight or branched chain. R and R' further represent hydroxyalkyl radicals derived from the foregoing alkylene radicals by the introduction of one or more hydroxyl groups. In particular they represent hydroxyalkyl radicals such as β-hydroxyethyl, β-hydroxypropyl, γ-hydroxypropyl, β,γ-dihydroxypropyl, β-hydroxybutyl, δ-hydroxybutyl, and the like. R and R' can also stand for alkenyl radicals, as for example, allyl, methallyl, crotyl and the like. One of the groups R and R' can be an aralkyl radical such as benzyl or phenethyl, the total number of carbon atoms of R and R' being 3 to 10. In the foregoing formula, R and R' may represent the same radical or they may represent widely different radicals, as for example, ethyl and phenethyl.

The anion X is chosen from inorganic and organic ions such as chloride, iodide, bromide, acetate, benzoate, benzenesulfonate, p-toluenesulfonate, o-toluenesulfonate, methosulfate, ethosulfate, and the like. It further represents organic anions such as those derived from the haloxanthines, as for example, 8-chlorotheophyllin, 8-bromotheophyllin, 8-chlorocaffeine, and the like.

My invention is further disclosed by the following compounds, which are typical of those within the purview of this application.

A. 1-methyl-1-ethyl-2,6-lupetidinium bromide, which has the formula

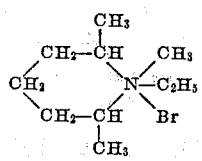

B. 1-methyl-1-isoamyl-2,6-lupetidinium chloride, of the formula

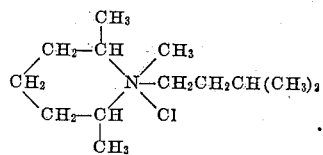

C. 1,1-diethyl-2,6-lupetidinium bromide, having the formula

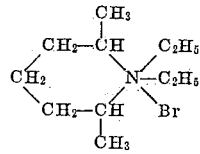

D. 1-n-propyl-1-γ-hydroxypropyl-2,6-lupetidinium chloride, which has the formula

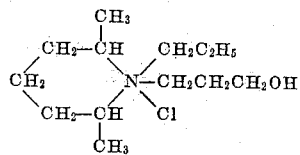

E. 1-n-propyl-1-methyl-2,6-lupetidinium iodide, of the formula

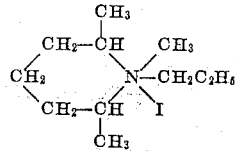

F. 1-β-hydroxyethyl-1-methyl-2,6-lupetidinium bromide, having the formula

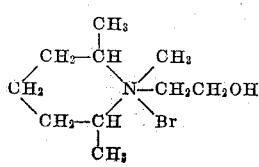

G. 1-butyl-1-isobutyl-2,6-lupetidinium bromide, of the formula

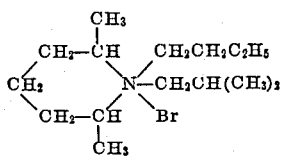

H. 1-β-acetoxyethyl-1-methyl-2,6-lupetidinium bromide, of the formula

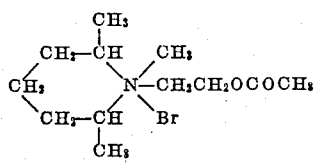

I. 1,1-bis - β - hydroxyethyl - 2,6 - lupetidinium chloride, having the formula

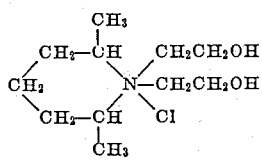

J. 1-benzyl-1-β-hydroxyethyl-2,6-lupetidinium chloride, of the formula

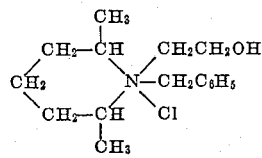

K. 1-benzyl-1-methyl-2,6-lupetidinium chloride, of the formula

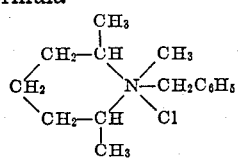

L. 1-allyl-1-isopropyl - 2,6 - lupetidinium bromide, which has the formula

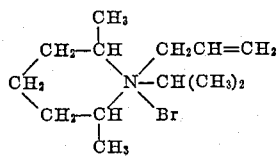

M. 1-methyl - 1 - β,γ - dihydroxypropyl-2,6-lupetidinium chloride, of the formula

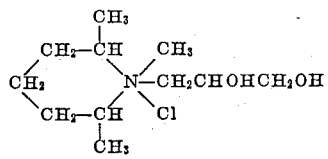

N. 1-nonyl-1-methyl - 2,6 - lupetidinium iodide, of the formula

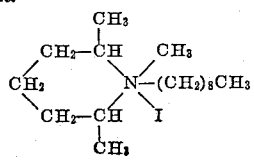

The compounds of this invention are prepared by treating a 1-alkyl- or 1-alkenyl- or 1-hydroxyalkyl-2,6-lupetidine of the following formula

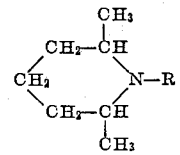

wherein R is an alkyl, alkenyl or hydroxyalkyl group, with an alkyl or alkenyl or hydroxyalkyl or aralkyl halide in the presence or absence of an inert solvent. While it is generally preferable to use a solvent in which the reagents are soluble and the quaternary ammonium salt is insoluble, this is not essential. Among such solvents are acetone, methyl ethyl ketone, aliphatic ethers, petroleum hydrocarbons, benzene, toluene, polyhalogenated hydrocarbons, and the like. Nitroparaffins such as nitromethane and nitroethane are excellent media for the reactions. These substances are solvents for the salts as well as the bases and must be evaporated. They appear to catalyze the reaction and are for this reason desirable. The quaternary ammonium salts may also be produced by treating a 1-substituted-2,6-lupetidine of the foregoing type with an alkyl sulfate or an alkyl arylsulfonate in the presence or absence of a solvent.

In general the desired quaternary ammonium salts crystallize upon chilling, and may be readily separated from the reaction mixtures. They may be purified by recrystallization or by washing with a suitable solvent. These compounds are soluble in water, being salts of strong bases with strong acids. They are frequently soluble in organic solvents such as alcohols. It is often possible to convert one quaternary ammonium salt of the type to which this application relates to a quaternary ammonium salt of another acid. For example, a quaternary ammonium iodide may be converted to the corresponding chloride by reacting the iodide with silver chloride in water and alcohol, or other lower organic solvent. In a similar way, a halide may be substituted by a more complex organic anion such as a benzoate, an acetate, or an 8-haloxanthine ion, by the use of a heavy metal salt of the complex organic anion.

My invention is further illustrated by the following examples, which are presented for the purpose of illustration and which are not intended to limit the invention in spirit or in scope. The relative amounts of materials are given in parts by weight.

*Example 1*

40 parts of 1-methyl-2,6-lupetidine and 40 parts of ethyl bromide are dissolved in 60 parts of methyl ethyl ketone and heated in a closed vessel for 2 hours at 100° centigrade. The reaction mixture is chilled and the crystalline precipitate of 1-methyl-1-ethyl-2,6-lupetidinium bromide (Compound A) is removed by filtration and dried. After recrystallization from isopropanol, this quaternary salt melts at about 281° C.

*Example 2*

51 parts of 2,6-lupetidine and 25 parts of ethyl bromide in 80 parts of methyl ethyl ketone are heated in a closed vessel for about 15 hours at 50–60° C. The precipitate of lupetidine hydrobromide is removed by filtration. The filtrate is evaporated and distilled. A mixture of secondary and tertiary amines boiling at 140–170° C. is obtained. This is treated with acetic anhydride, and then with p-toluene-sulfonyl chloride to remove secondary amine. The purified 1-ethyl-2,6-lupetidine distils at 163–167° C.

24 parts of 1-ethyl-2,6,-lupetidine, 20 parts of ethyl bromide, and 80 parts of methyl ethyl ketone are heated in a closed vessel for about 3 hours at 150–155° C. The reaction mixture is then chilled and the precipitate of 1,1-diethyl-2,6-lupetidinium bromide (Compound C) is removed by filtration and washed with warm methyl ethyl ketone. After recrystallization from isopropanol, this quaternary salt melts at 263–265° C.

*Example 3*

1-n-propyl-2,6-lupetidine is prepared by heating under pressure at 50–60° C. 23 parts of 2,6-lupetidine and 17 parts of n-propyl iodide. The precipitate of lupetidine hydriodide is removed by filtration, and the filtrate is evaporated. The residue of 1-n-propyl-2,6-lupetidine distills at about 104° C. at 65 millimeters pressure.

80 parts of 1-n-propyl-2,6-lupetidine and 100 parts of methyl iodide dissolved in 320 parts of methyl ethyl ketone are heated at about 50° C. in a closed vessel. An immediate reaction ensues and a precipitate of 1-n-propyl-1-methyl-2,6-lupetidinium iodide (Compound E) forms. This salt is removed by filtration, washed with methyl ethyl ketone, and melts at about 238° C. with decomposition.

*Example 4*

A solution of 108 parts of 1-ethyl-2,6-lupetidine, 193 parts of ethyl iodide and 85 parts of nitromethane is refluxed for 5 hours. The solvent is removed by evaporation under reduced pressure. The residue of 1,1-diethyl-2,6-lupetidinium iodide is collected on a filter and washed with methyl ethyl ketone. After drying at 50° C. the iodide is converted to the corresponding bromide as follows: 213 parts of 1,1-diethyl-2,6-lupetidinium iodide in 1000 parts of water are stirred for 1 hour at 80–90° C. with a suspension of 188 parts of silver bromide. The precipitate of silver salts is removed and washed by filtration and the filtrate is evaporated in vacuo. The residue of 1,1-diethyl-2,6-lupetidinium bromide is purified by recrystallization from isopropanol and melts at about 260° C.

I claim:

1. A new composition of matter having the following structural formula

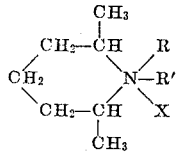

wherein R and R' are members of the group consisting of alkyl and alkenyl radicals, and X is a monovalent anion, and wherein the total number of carbon atoms of R and R' is at least 3 and not greater than 10.

2. A 1,1-dialkyl-2,6-lupetidinium halide, wherein the total number of carbon atoms of the alkyl radicals is at least 3 and not greater than 10.

3. 1,1-diethyl-2,6-lupetidinium bromide.

4. 1-methyl-1-ethyl-2,6-lupetidinium bromide.

RICHARD A. ROBINSON.

REFERENCES CITED

The following references are of record in the file of this patent:

UNITED STATES PATENTS

| Number | Name | Date |
|---|---|---|
| 1,567,200 | Stavdinger | Dec. 29, 1925 |
| 2,032,097 | Piggott et al. | Feb. 25, 1936 |
| 2,064,797 | Holsten | Dec. 15, 1936 |
| 2,152,047 | Hohl et al. | Mar. 28, 1939 |
| 2,170,111 | Bruson | Aug. 22, 1939 |
| 2,200,603 | Hentrich | May 14, 1940 |
| 2,295,504 | Shelton | Sept. 8, 1942 |
| 2,299,782 | Allen | Oct. 27, 1942 |
| 2,355,659 | Lee et al. | Aug. 15, 1944 |

OTHER REFERENCES

Chemical Abstracts (Kamizyo), vol. 34, p. 7428 (1940).

Mannich, Chem. Abstracts, vol. 28 (1934), pp. 4059–4061.

McElvain et al., J. Amer. Chem. Soc., vol. 681 (1946), pp. 2592–2600.